United States Patent [19]

Reed

[11] 4,317,693
[45] Mar. 2, 1982

[54] METHOD AND APPARATUS FOR FORMING FIBER REINFORCED COUPLING SLEEVES

[75] Inventor: Norman D. Reed, Frontenac, Kans.

[73] Assignee: W. S. Dickey Clay Manufacturing Co., Pittsburg, Kans.

[21] Appl. No.: 160,859

[22] Filed: Jun. 19, 1980

[51] Int. Cl.³ .................. B65H 81/00; F16L 47/00
[52] U.S. Cl. ............................. 156/175; 156/425; 249/178; 285/369; 285/423
[58] Field of Search ............... 156/172, 173, 175, 425; 285/369, 235, 423; 249/178, 180, 65

[56] References Cited

U.S. PATENT DOCUMENTS

| | | | |
|---|---|---|---|
| 2,930,634 | 3/1960 | Merritt | 285/21 |
| 3,200,023 | 8/1965 | Cilker | 156/172 |
| 3,453,006 | 7/1969 | Levake | 285/235 |
| 3,558,164 | 1/1971 | Havell | 285/236 |
| 3,775,207 | 11/1973 | Harmon | 156/175 |
| 4,023,835 | 5/1977 | Ewing et al. | 285/235 |
| 4,049,482 | 9/1977 | Webb | 156/172 |
| 4,065,339 | 12/1977 | Lippert et al. | 156/149 |
| 4,098,528 | 7/1978 | Stanley | 285/235 |
| 4,106,797 | 8/1978 | Michael | 285/156 |
| 4,126,339 | 11/1978 | Thompson | 285/369 |
| 4,155,573 | 5/1979 | Ehlers | 285/363 |
| 4,174,125 | 11/1979 | Wyss | 285/369 |
| 4,213,641 | 7/1980 | Bennett | 285/369 |
| 4,233,020 | 11/1980 | Oswald | 156/425 |

Primary Examiner—Michael W. Ball
Attorney, Agent, or Firm—Fishburn, Gold and Litman

[57] ABSTRACT

An apparatus and method is provided for fabricating plain-end pipe couplings. Ribbons of resin-soaked fiber reinforced plastic strands are wrapped about a rotating operably expandable mandrel which has placed therearound a pliable resilient form collar which defines an inner surface of such a coupling. After curing, the wrapped ribbons form a rigid coupling. The mandrel is thereafter collapsed and the coupling removed therefrom. The pliable collar is then separated from the coupling.

10 Claims, 12 Drawing Figures

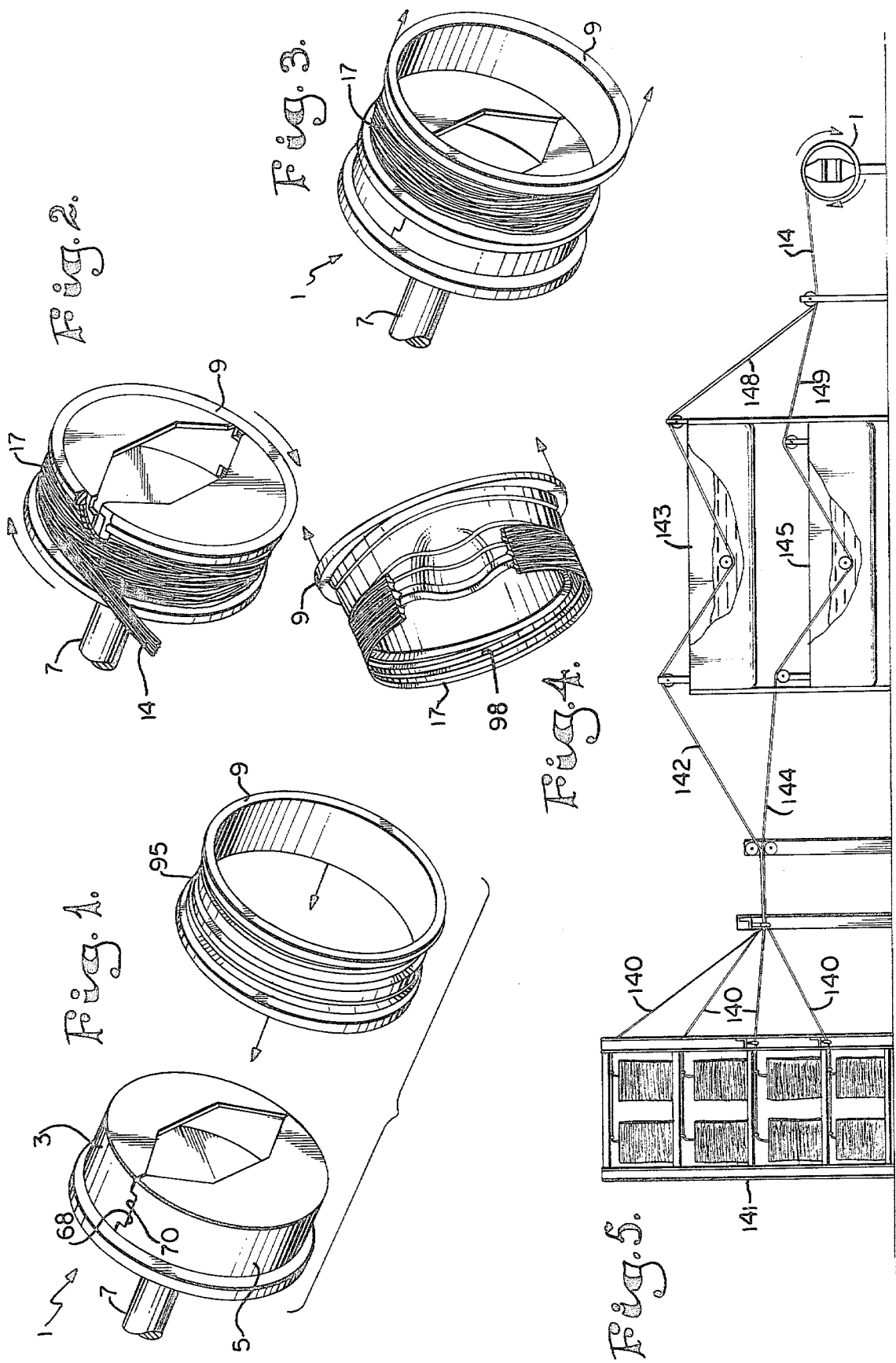

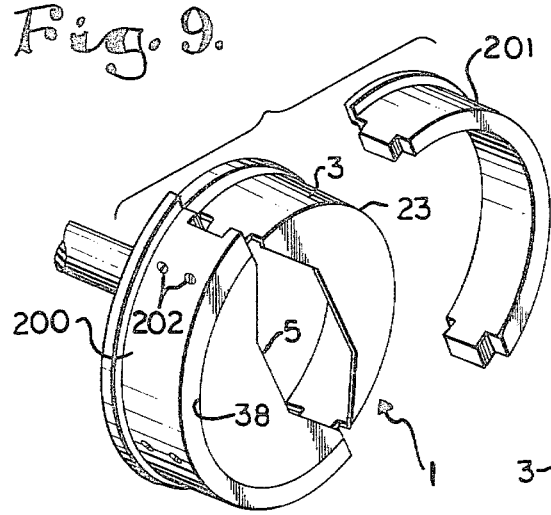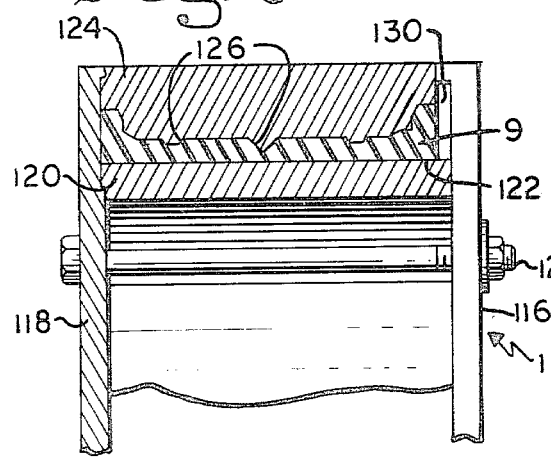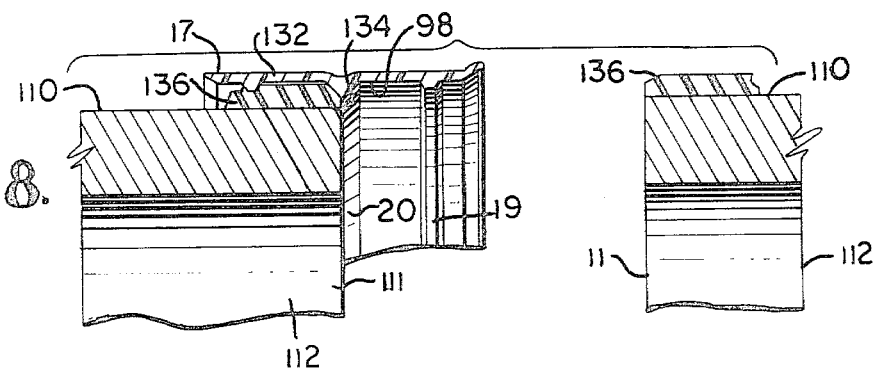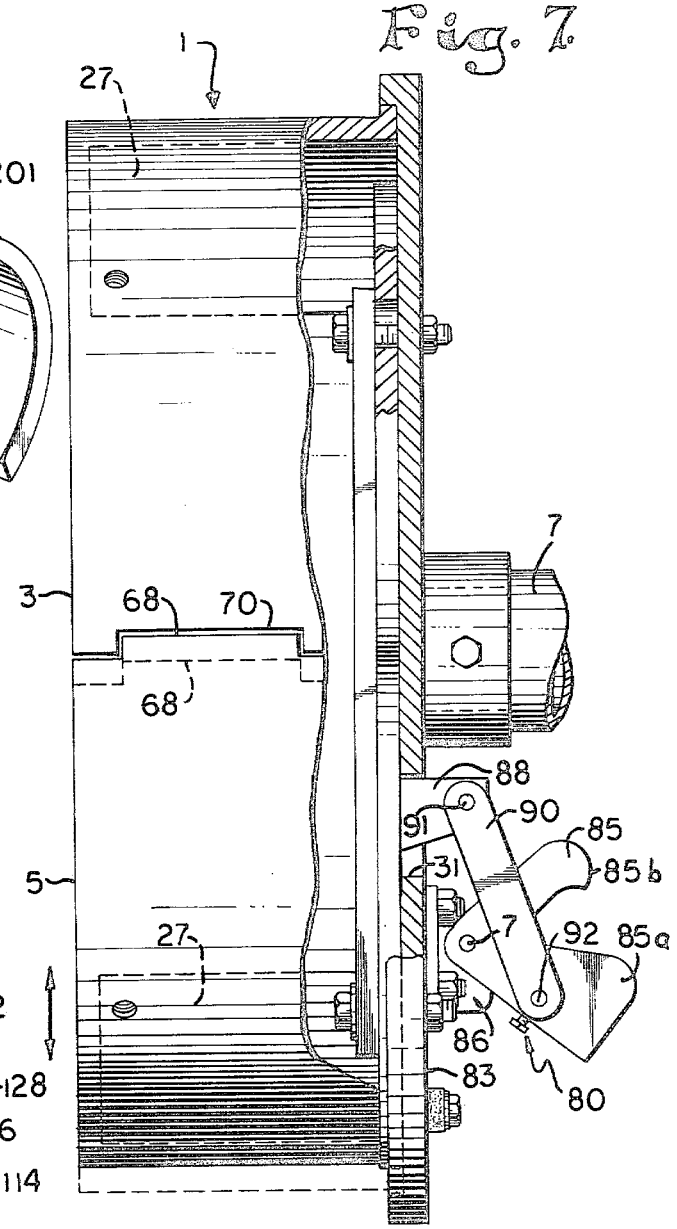

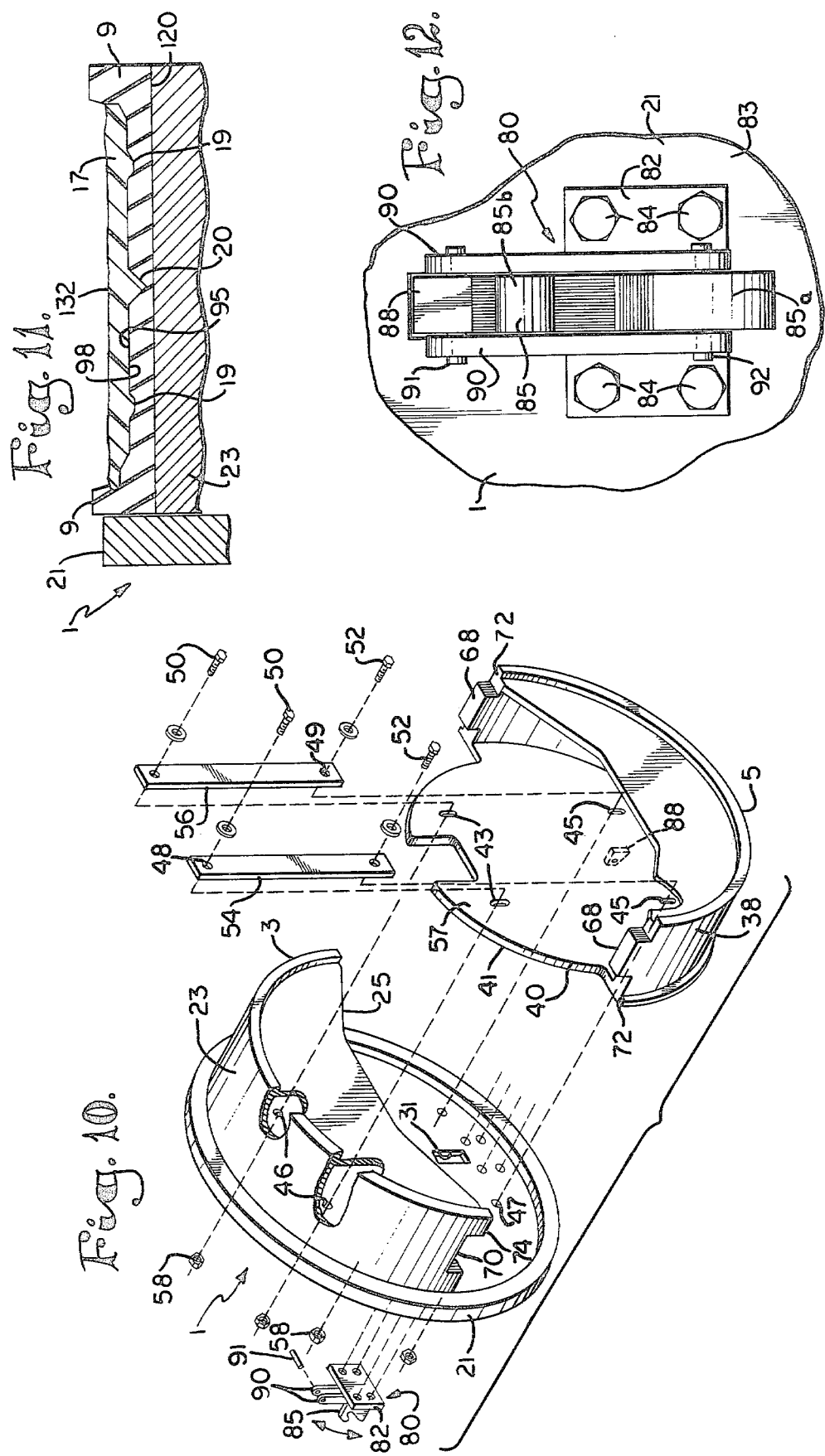

METHOD AND APPARATUS FOR FORMING FIBER REINFORCED COUPLING SLEEVES

BACKGROUND OF THE INVENTION

This invention relates to plain-end pipe couplings and a method and apparatus for manufacturing same and more specifically, to plain-end pipe couplings made of fibrous glass reinforced plastic wrapped or applied on a collapsible mandrel utilizing a polyurethane mold collar and, to a method and apparatus for manufacturing same.

Many underground water systems have historically been made of vitrous clay pipe coupled together at abutting ends by a bell and a spigot. Of late attempts have been made to utilize "plain-end" pipes, or pipes that have a uniform diameter throughout their whole length. Plain-end pipes have been found to be more efficient to produce but are problematic in respect to providing an adequate watertight seal at their junction.

Water leakage can occur axially along an outer cylindrical surface of the pipe as a result of a coupling that doesn't seal the pipe thouroughly. This usually occurs because either because of a size or shape difference the coupling lacks adequate sealing ability around the coupling mating surface of the pipe or because of a non-uniformity in the diameter of the pipe at the point of sealing. Leakage can also occur because of a shear strain occuring in the coupling at the point of the junction between the pipes themselves.

In many prior art couplings, the coupling is unable to provide a seal along the total cylindrical surface of the pipe or, if able to provide an adequate seal as such, the couplings are normally pliable or nonrigid in nature and do not have the required structural strength or integrity to resist forces acting in a shear direction between the two pipe ends, thereby allowing the pipe to separate and/or the pipes and the coupling to separate and therefore produce a water leak.

Another drawback in the prior art is associated with the complicated design of many of the conventional couplings, some of which couplings have had an elastomeric binding with fibers fabricated therearound. Other conventional couplings have had an inner section situated between two outer end sections with each section being laminated with different materials.

OBJECTS OF THE INVENTION

Therefore, the objects of this invention are: to provide a pipe coupling for plain-end pipes that is capable of preventing water leakage both in axial and in shear directions; to provide such a coupling that is rigid; to provide such a rigid coupling which, when used with elastomeric gaskets positioned about the ends of the pipes, will prevent water leakage therearound; to provide a method of manufacturing such a coupling that comprises winding or applying curable fiber reinforced plastic material on a removable polyurethane collar which collar has an irregular outer surface which surface defines an inwardly projecting cavity on the inner surface of the coupling; to provide such a method which allows simple repetition thereof on reusable equipment to produce multiple couplings; to provide such a collar which is associated with an operably expandable mandrel, which mandrel collapses to allow the removal of the collar and coupling therefrom; to provide such a mandrel which is operably expandable and collapsible; to provide such a collar which is pliable and therefore can be manipulated from engaging contact with an inner cylindrical surface of a cured coupling; to provide such a mandrel and collar which are easy to manufacture and use; to provide such a coupling which is simple in design, relatively inexpensive to produce, easy to manufacture and particularly well adapted for the proposed usage thereof.

Other objects and advantages of this invention will become apparent from the following description taken in connection with the accompanying drawings wherein are set forth, by way of illustration and example, certain embodiments of this invention.

SUMMARY OF THE INVENTION

A pipe coupling device for plain-end pipes is provided which comprises a rigid generally cylindrically shaped sleeve wound from continuous strands of fiber soaked in rigid or hard curing resin. A pliable, resilient, generally cylindrical collar having an irregular outer surface is received on an operably expandable and rotatable mandrel. The strands are wound on the collar to form an annular coupling and thereafter the plastic is cured. The mandrel is collapsed to allow the removal therefrom of the collar and coupling which collar is pliable and is manipulated so as to remove same from engagable contact an inner surface of the coupling. The inner surface of the coupling conforms to irregularities existing in an outer surface of the collar. Preferably, inwardly extending ridges are formed on the coupling inner surface defining therebetween a cavity, such ridges being adapted for facilitating the coupling of two pipes.

The drawings constitute a part of this specification and include exemplary embodiments of the present invention and illustrate various objects and features thereof.

BRIEF DESCRIPTION OF THE DRAWINGS

FIG. 1 is a perspective view of a portion of an apparatus for forming fiber reinforced coupling sleeves according to the present invention detailing a step in a process of manufacturing the coupling wherein a collar is placed over an expandable mandrel.

FIG. 2 is a perspective view of a portion of apparatus detailing a step in the process wherein fiber reinforced plastic is wrapped about the collar and mandrel.

FIG. 3 is a perspective view of a portion of the apparatus and the coupling detailing a step in the process wherein the coupling and collar are removed from the mandrel.

FIG. 4 is a perspective view of the coupling and collar detailing a step in the process wherein the collar is removed from the coupling.

FIG. 5 is a partly schematic view of the apparatus on a reduced scale relative to FIG. 1.

FIG. 6 is a partial vertical cross-sectional view of an apparatus for manufacturing the collar.

FIG. 7 is an enlarged side elevational view of the mandrel shown in FIG. 1 with portions broken away to disclose detail thereof.

FIG. 8 is a partial cross-sectional view of the rigid coupling in the process of joining two pipes.

FIG. 9 is a perspective view of the mandrel with a partly exploded sleeve for enlarging the mandrel thereon.

FIG. 10 is an exploded and enlarged view of the mandrel of FIG. 1 with portions broken away to show detail thereof.

FIG. 11 is an enlarged and partial vertical cross-sectional view of the mandrel with the collar and coupling thereon.

FIG. 12 is an enlarged and side elevational view of an expansion control mechanism for the mandrel.

DETAILED DESCRIPTION OF THE PREFERRED EMBODIMENT

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring in more detail to the drawings.

The numeral 1 generally represents an operably expandable and collapsible mandrel. The mandrel comprises two half sections, a first 3 and a second 5, and is adapted to rotate on a shaft 7 which is connected to a rotating means (not shown). A pliable, resilient form collar 9 made of an elastomeric material is placed on the mandrel 1 when such a mandrel is in a collapsed position by sliding thereon. The collar 9 is snugly fitted to the mandrel 1 when the latter is in an expanded position thereof. A curable and formable material which, when cured, will harden, such as continuous ribbons 14 of fiber impregnated with plastic, for instance, the type generally marketed under the trademark Fiberglas, is applied to an outer surface 10 of the collar 9. When cured the material will comprise a rigid annular member shown here as a pipe coupling 17, which coupling has inwardly projecting ridges 19 and 20.

Referring more particularly to FIGS. 7 and 10, the mandrel 1 comprises a circular back plate 21, which has attached thereto the first half section 3. The first half section 3 has a substantially cylindrical outer surface 23 and a front web portion 25. Reinforcing plates 27, FIG. 7 are provided for strengthening. The first half section 3 is secured to the back plate 21 by welding on the like. A slot 31 is provided in the back plate 21, the function of which will be discussed presently.

The second half section 5 comprises a substantially cylindrical outer surface 38 and is mounted on a substantially circular inner plate 40, see FIG. 10, an outer surface 41 thereof slidably engaging the back plate 21. The inner plate 40 contains therein pairs of slots 43 and 45 through which bolts 50 and 52 project. The bolts 50 and 52 are respectively positioned at a one end thereof through apertures 46 and 47 in the back plate 21 and at the other end thereof through apertures 48 and 49 in two holding plates 54 and 56. The holding plates 54 and 56 are secured in slidable contact with an inner surface 57 of the inner plate 40 by the bolts 50 and 52 which are held in place by nuts 55 or the like and function to retain the back plate 21 and inner plate 40 in slidable contact. The slots 43 and 45 in the inner plate 40 are aligned such that when the nuts 58 are loosened the inner plate 40 can slide relative to the back plate, thereby allowing the mandrel 1 to expand or collapse. During normal operation the nuts 58 are not loosened.

Mateable tabs 68 and recesses 70 are positioned along edge portions 72 and 74 of the members defining the first and second outer surfaces 23 and 38, respectively, to enhance support provided to the collar 9 when the mandrel 1 is expanded.

A toggle assembly, see FIGS. 7 and 12, generally designated 80, is used to bias the two half sections 3 and 5 apart and together, thereby expanding and collapsing the mandrel 1. A bracket 82 is securely attached to a surface 83 of the back plate 21 by bolts 84 or the like. A lever 85, has a recess therein (not shown) by means of which the lever 85 is pivotally connected to a tab 86 which projects outwardly from the bracket 82 by a pin 87. The lever 85 includes first and second lugs 85a and 85b respectively which lugs can have force applied thereto to urge the lever 85 to pivot or rock about the pin 87. The slot 31 in the back plate 21 is aligned with the direction of motion of the mandrel back plate 21 relative to the plate 40 and receives therethrough an ear 88 which is attached to the inner plate outer surface 41. A pair of links 90 is pivotally connected by a pin 91 near a first end thereof to the ear 88 and by another pin 92 near a second end thereof to the lever 85. The lever arm 85 when rotated about the pin 87 functionally biases the tab 86 and ear 88 toward and away from each other thereby operably collapsing or expanding the mandrel 1 respectively.

The collar 9 is of such a size as to slip over the mandrel 1 as shown in FIG. 1, when such mandrel is in a collapsed position, and further is of such a diameter that, when expanded, the mandrel 1 is slightly larger in diameter than the collar 9 thereby requiring the collar 9 to elastically expand somewhat and thus snugly retaining the collar 9 on the mandrel 1.

The collar 9 has an outer arcuate or generally circular surface 95, FIG. 11, which is uneven or irregular in contour. These irregularities are transferred in reverse to an inner surface 98, FIG. 11, of the pipe coupling 17, preferably forming thereon the inwardly projecting circumferential ridges 19 near each opposing end of the coupling 17 and the ridge 20 near a center portion of the coupling 17.

The collar 9, as shown, is molded of a pliable, resilient material such as polyurethane or the like which will allow the collar 9 to be manipulated and removed from the inside surface 98 of the rigid and cured coupling 17, as seen in FIG. 4. Also, the collar material must be strong enough so as not to deform excessively when winding the ribbons 14 thereon. It has been found that a material having a durometer reading of 55 to 60 is adequate but other materials may perform equally well.

A device to mold the collar 9 is shown in FIG. 6 and is designated generally by the numeral 114. The mold device 114 comprises a side member 116 and a brace 118, an inner arcuate member 120 which molds or forms a generally cylindrical mandrel engaging surface 122 on the collar 9, and an outer arcuate member 124 which is generally cylindrical with circumferential irregularities 126 on a surface thereof. The inner surface of the arcuate member 124 defines a mold for the outer collar surface 95.

Bolts 128 or the like are provided which function to hold the mold device 114 together while forming the collar 9. During formation of the collar 9, the mold device 114 is placed with the side member 116 down and plastic elastomeric or the like material is poured between the members 122 and 124. An aperture or open top 130 is provided 124 to allow the pouring therethrough of the material used to form the collar 9.

The pipe coupling 17, which can be seen in cross section in FIG. 11, comprises a rigid annular member having spaced apart arcuate surfaces which, in this example, are two substantially concentric generally cylindrical or circular surfaces, the inner surface 98 and an outer surface 132. The inner surface 98 has certain circumferential irregularities thereon. The coupling is made of a material which when cured will harden. As seen in FIG. 11, the ridges 19 and 20 project inwardly from the coupling inner surface 98.

The ridges 19 are each adapted to sealingly engage an elastomeric gasket 136, as shown in FIG. 8, which gaskets are operably positioned about adjacent outer cylindrical surfaces 110 of abutting ends 111 of two plain-end pipes 112 which are to be coupled together.

As shown, the outer surface of each of the mandrel half sections 23 and 38 are generally semicircular in cross section. Also, the collar 9 is shown as being substantially circular. It is envisioned that collars having an outer surface of differing shapes, such as ovate, diamond, or rectangular could be utilized to mold a pipe coupling to be used with pipes of corresponding shapes. When used with various shaped collars, the mandrel may be modified to better fit the particular shape of the collar. It is also noted that while the coupling 17 of the present embodiment has three ridges 19 and 20, it is foreseen that any number or ridges, cavities, or even a smooth exterior could be formed on the interior surface of the coupling 17.

In an alternate embodiment as shown in FIG. 9, two semicircular annular sleeves 200 and 201 are secured to the outer cylindrical surfaces 23 and 35 of the half sections 3 and 5. The sleeves 200 and 201 function to increase the diameter of the mandrel 1 and are positioned on the half sections 3 and 5 such as not to hinder the expanding and collapsing nature of the mandrel 1 and attached with screws 202 or the like. With the sleeves 200 and 201 attached to the mandrel 1, pipe couplings of diameters can be fabricated which differ from the coupling 17 shown in the other figures.

A method for using the mandrel 1 and collar 9 to produce a coupling 17 is as follows:

Material, such as shown here as filaments 140 of fibrous glass to be impregnated with plastic are prepared for application on the mandrel 1. With reference to FIG. 5, the filaments 140 are drawn from a storage or staging area 141 and collated into two strands, with one strand 142 being dipped in a tube of a first portion 143 of a curable resin and the other strand 144 being dipped in a tube of a second portion 145 of a curable resin. Suitable portions 143 and 145 of a curable resin may be a conventional catalyst and promotor such as is used in fiber reinforced plastics or a suitable equivalent thereof. Soaked strands 148 and 149 exit the tubs and are joined.

Prior to applying the soaked strands 148 and 149 to the mandrel 1, form means such as the mold or form collar 9 is preferably placed around the mandrel 1 while in the collapsed position thereof, as seen in FIG. 1. The mandrel 1 is expanded by rotating the lever 85 in a clockwise direction, as seen in FIG. 7, to force the inner plate 40 to slide relative to the back plate 21 thereby increasing the diameter of the mandrel 1 and snugging or securing the collar 9 thereon. It is foreseen that the form means could be an integral portion of the mandrel 1. The lever 85 may be actuated by a hydraulic cylinder (not shown) or by means of manual manipulation of a handle (not shown) attached thereto.

A release agent (not shown) may be applied to the collar outer surface, so that the cured coupling 17 will not adhere thereto. Also, additional resin without a fibrous strand therein may be first applied to the collar outer surface 95 to assure that the coupling inner surface 98 will substantially have the shape of the collar outer surface 95 without skips or voids therein.

In the present embodiment both prepared or soaked strands 148 and 149 are collated into a single ribbon 14 which is then applied to the collar outer surface 95. The mandrel 1 is rotated about the shaft 7 which in turn winds the ribbon 14 onto the collar 9. While rotating the mandrel 1 the ribbon 14 may be directed by means (not shown) transversely along the collar outer surface 95 to assure a coupling 17 of substantially uniform thickness except for the ridges 19 and 20.

As the ribbon 14 is wound, resistive tension is provided thereto which in effect tends to compact the ribbon 14 on the collar 9 and sufficiently mix the resin materials in a somewhat homogenous mixture interbetween the strands contained in the ribbon 14. After enough thickness is achieved the mandrel 1 rotation is stopped and the ribbon 14 severed. A result of the compacting of the ribbons 14 while winding is that some of the resin is squeezed out of the ribbon 14 to the coupling other surface 132 such that this surface cures in a smooth manner.

The collar 9 is left on the mandrel 1 while the coupling 17 cures. Curing generally takes approximately 5 minutes when using infra-red heaters but curing may be by self generated reaction or other curing means if time permits. After curing, of the coupling 17 the mandrel 1 is collapsed by manipulating the toggle 80, and the collar 9 and coupling 17 are removed therefrom as a unit, see FIG. 3. The collar 9 is then manipulated, see FIG. 4, and removed from engaging contact with the coupling inner surface 98.

While the term "annular" is used therein to illustrate a solid object such as the collar 9 or coupling 17, having two generally cylindrically shaped and spaced surfaces, the term is understood to apply to any solid object having two spaced arcuate or nonlinear surfaces. In addition the term "curable resin or material" is used herein to describe any of the conventional plastics or the like which have a semisolid or manipulative state and which harden, cure or the like, whether by time, heat or other expedient, to a substantially solid or rigid state.

It is also foreseen that the reinforcing fiber could be discrete short pieces such as chopped fiberglass or alternatively no fiber could be utilized if the resin material will provide satisfactory strength to the coupling when no fiber or short fibers are utilized. The curable material may be applied directly to the mandrel or molding collar.

It it further foreseen that the present invention could be utilized in combination with a plain-end pipe wherein one side of the coupling would be applied directly to the pipe and the other end would be formed on a mandrel as described herein. In particular the fiber reinforced plastic may be wrapped about or applied simultaneously to both an end of the pipe and to the mandrel. The mandrel would then be collapsed leaving one end of the coupling free to join with a second pipe and the opposite end of the coupling fixedly joined to the first pipe.

It is to be understood that while certain embodiments of the present invention have been illustrated and described herein, it is not to be limited to the specific forms or arrangement of parts described and shown.

What is claimed and desired to secure by Letters Patent is:

1. A method of fabricating a rigid pipe coupling of continuous strand fiber reinforced plastic comprising the steps of:
   (a) placing an elastomeric and annular one-piece collar having an outer surface with a pair of axially spaced, annular irregularities extending inwardly therefrom on a mandrel while said mandrel is in a collapsed position and prior to applying the continuous strand fiber to said mandrel;
   (b) radially expanding said mandrel to operably engage said collar prior to applying the continuous strand to said mandrel;
   (c) applying to at least one substantially continuous strand a material which cures to a substantially rigid state;
   (d) applying said strand to said outer surface of said collar and into said annular irregularity;
   (e) curing said material thereby forming a rigid coupling with an inner surface having a pair of axially spaced circumferential ridges each extending inwardly into a respective annular irregularity;
   (f) radially collapsing said mandrel;
   (g) removing said collar and said coupling from said collapsed mandrel; an
   (h) manipulating said elastomeric collar to remove same from said rigid coupling.

2. A method as set forth in claim 1 including the step of:
   (a) rotating said mandrel while applying said material thereto.

3. A method as in claim 2 including the step of:
   (a) applying said material in layers to shape said uncured annular member.

4. A method as in claim 2 wherein:
   (a) said curable material comprises a curable resin, and including the step of;
   (b) winding said strand on said mandrel.

5. A method as set forth in claim 1 including the step of:
   (a) applying a release agent to said mandrel while in said expanded position prior to applying said curable material thereon.

6. A method of fabricating a rigid pipe coupling of continuous strand fiber reinforced plastic comprising the steps of:
   (a) placing an elastomeric and annular one-piece collar having an outer surface with a pair of axially spaced, annular irregularities extending inwardly therefrom on a mandrel while said mandrel is in a collapsed position and prior to applying the continuous strand fiber to said mandrel;
   (b) radially expanding said mandrel to operably engage said collar prior to applying the continuous strand fiber to said mandrel;
   (c) applying to at least on substantially continuous strand a material which cures to a substantially rigid state;
   (d) rotating said mandrel;
   (e) wrapping said strand about said rotating mandrel while said mandrel is in its expanded;
   (f) distributing said strand laterally in layers on said mandrel and into said annular irregularities to shape a coupling of desired thickness distribution;
   (g) curing said material thereby forming a rigid coupling with an inner surface having a pair of axially spaced circumferential ridges each extending inwardly into a respective annular irregularity;
   (h) radially collapsing said mandrel;
   (i) removing said collar and said coupling from said collapsed mandrel; and
   (j) radially collapsing and axially withdrawing said collar from said rigid coupling.

7. An apparatus for producing a rigid substantially annular member comprising:
   (a) mandrel reversibly radially movable between an expanded position and a collapsed position and having a substantially cylindrical outer surface;
   (b) an elastomeric, one-piece annular collar adapted to operably engage said cylindrical outer surface, said collar having an outer surface with a pair of axially spaced, annular irregularities extending inwardly therefrom;
   (c) said collar being adapted to receive on said outer surface and in said annular irregularities thereof at least one continuous strand with a material applied thereto which cures to a substantially rigid state, said strand defining a substantially annular member;
   (d) rotating means for rotating said mandrel and said collar as said strand is received by said collar;
   (e) drying means to cure said material;
   (f) control means for radially manipulating said mandrel between said expanded and said collapsed position thereof; said collar being removable from said mandrel when said mandrel is in the collapsed position thereof.

8. An apparatus as in claim 7 wherein:
   (a) said elastomeric collar outer surface mates with said annular member such that said annular member has ridges defined on an inner side thereof.

9. An apparatus as set forth in claim 7 wherein said preparing means includes:
   (a) means for soaking said strand in resin prior to distributing said strand on said mandrel.

10. The apparatus as set forth in claim 9 including:
    (a) a strand supply mechanism for delivering said continuous strand to said mandrel after soaking said strand in said resin.

* * * * *